US012333954B2

(12) United States Patent
Frontera Sánchez et al.

(10) Patent No.: US 12,333,954 B2
(45) Date of Patent: Jun. 17, 2025

(54) MACHINE AND PROCESS FOR VEHICLE TRAJECTORY CONTROL

(71) Applicant: The Boeing Company, Arlington, VA (US)

(72) Inventors: Guillermo Frontera Sánchez, Madrid (ES); Javier Lopez Leones, Majadahonda (ES)

(73) Assignee: The Boeing Company, Arlington, VA (US)

( * ) Notice: Subject to any disclaimer, the term of this patent is extended or adjusted under 35 U.S.C. 154(b) by 13 days.

(21) Appl. No.: 18/457,241

(22) Filed: Aug. 28, 2023

(65) Prior Publication Data

US 2024/0135828 A1 Apr. 25, 2024
US 2024/0233558 A9 Jul. 11, 2024

(30) Foreign Application Priority Data

Oct. 21, 2022 (EP) .................................... 22383020

(51) Int. Cl.
*G08G 5/22* (2025.01)
*G08G 5/50* (2025.01)
*G08G 5/55* (2025.01)
*G08G 5/56* (2025.01)

(52) U.S. Cl.
CPC ................ *G08G 5/56* (2025.01); *G08G 5/22* (2025.01); *G08G 5/50* (2025.01); *G08G 5/55* (2025.01)

(58) Field of Classification Search
CPC .. G08G 5/56; G08G 5/50; G08G 5/55; G08G 5/22
See application file for complete search history.

(56) References Cited

U.S. PATENT DOCUMENTS

| | | | |
|---|---|---|---|
| 9,536,435 | B1 | 1/2017 | Shay |
| 9,607,521 | B2 | 3/2017 | Coulmeau et al. |
| 2016/0078770 | A1 | 3/2016 | Coulmeau et al. |

FOREIGN PATENT DOCUMENTS

| | | |
|---|---|---|
| EP | 4012684 A1 | 6/2022 |

OTHER PUBLICATIONS

European Patent Office Extended Search Report, dated Mar. 23, 2023, regarding Application No. EP22383020.9, 10 pages.

Walter R Ed—Spitzer C R: "The Avionics Handbook, Chapter 15 : Flight Management Systems", Jan. 1, 2001 (Jan. 1, 2001), The Avionics Handbook; [The Electrical Engineering Handbook Series], CRC Press, Boca Raton, Fla, pp. 1-25.

*Primary Examiner* — Mathew Franklin Gordon
(74) *Attorney, Agent, or Firm* — Yee & Associates, P.C.

(57) ABSTRACT

Illustrative examples are provided of a process and machine configured to provide innovative technical solutions for: deriving a predicted trajectory for a vehicle; controlling a trajectory for a vehicle; and for reducing congestion in an Air Traffic Management system, via: a processor executing an algorithm specially programmed for: generating a baseline lateral profile for a baseline trajectory; subsequently generating a baseline vertical profile for the baseline trajectory; subsequently forming the baseline trajectory by merging the vertical profile with the baseline lateral profile; and using at least one of: a performance element, or a configuration element, from the baseline trajectory for deriving the predicted trajectory. The predicted trajectory is sent for use by a Flight Management System and/or an Air Traffic Management System.

20 Claims, 3 Drawing Sheets

MACHINE AND PROCESS FOR VEHICLE TRAJECTORY CONTROL

CROSS-REFERENCE TO RELATED APPLICATION

This application claims priority to European Patent Application Serial No. 22383020.9, filed Oct. 21, 2022, and entitled "Machine and Process for Vehicle Trajectory Control," which is incorporated herein by reference in its entirety.

BACKGROUND INFORMATION

1. Field

The present disclosure relates generally to providing guidance for a vehicle. More particularly, the disclosure relates to generating a trajectory for a vehicle.

2. Background

Guidance and/or control of a vehicle involves at least one of designating, and/or predicting a trajectory for the vehicle. A future state of the vehicle may be influenced by various constraints on a motion of the vehicle or and/or effects and/or by inputs to and displacements of control elements of a control system for the aerospace. The constraints and/or effects may be physical and/or regulatory. The physical constraints may include performance limitations of the vehicle. Inputs to control elements of the vehicle intend to place the vehicle in a desired state. A future state of a vehicle may be established and/or influenced by inertia established by inputs to the control elements intended for the vehicle to perform a particular maneuver, as well as by exogenous influences on the vehicle.

Current processes and machinery for trajectory control and/or predictions for a vehicle have included decoupling lateral and vertical profile generations for an intended trajectory for the vehicle between a given set of turn points along a desired track of the vehicle. Vertical profiles may include accelerations and/or decelerations of speed needed to meet an altitude and airspeed requirement at each turn point along a designated track for the vehicle.

For an aerospace vehicle, aerodynamic performance in a lateral and a vertical direction may be aerodynamically interrelated and/or coupled as may be equations of motion descriptive thereof. One of ordinary skill in the art understands that determining the lateral (also referred to as horizontal) profile and the vertical profile for an aerospace vehicle is a complex task, since there are different kinds of constraints that cannot be addressed independently, as they are interrelated, and the process should ensure compliance with the aerospace vehicle performance characteristics.

Most existing methods for aerospace vehicle trajectory control and/or predictions use rough estimations for a speed of the vehicle at a turn point on the lateral profile to determine a turn radius at the turn point to complete the lateral profile and then use the lateral profile to separately generate the vertical profile for the intended trajectory for the vehicle. Examples for current aerospace vehicle trajectory control and/or predictions are provided at least in:

A. A. Herndon, R. H. Mayer, R. C. Ottobre, and G. G. Tennille, Analysis of Advanced Flight Management Systems (FMSs), FMC Field Observations Trials, MiTRE Corporation Virginia, 2006; Formal Mission Specification and Execution Mechanisms for Unmanned Aircraft Systems, Eduard Santamaria Barnaba's, PhD Thesis, Technical University of Catalonia, June 2010; CTAS Tools. NASA Ames http://www.aviationsystemsdivision.arc.nasa.gov/research/foundations/index.shtml; and OSYRIS, Arrival and Departure Manager. Barco. http://www.barco.com/airtrafficcontrol/product/1229

Making the estimations for the speed of the vehicle at the turn point can be difficult, and the estimations for the speed of the vehicle at the turn point are not always accurate or precise. Overly conservative estimations may be made to ensure that the vehicle may actually follow the lateral profile derived. While the resulting lateral profile derived from the current processes and machinery for the trajectory control and/or predictions for the vehicle may be feasible, the resulting lateral profile may not necessarily achieve desired efficiency for control and or operation of the vehicle.

One of ordinary skill in the art understands that current solutions, such as without limitation the "Center-TRACON Automation System (CTAS) Trajectory Synthesizer," build an "approximate vertical profile" using heavy assumptions. As a non-limiting example, CTAS currently assumes fixed climb/descent rates and no accelerations nor decelerations of the vehicle as it estimates speeds at each turn point. The current CTAS process and machine then use the heavy assumption based "approximate vertical profile" to compute a lateral profile for the trajectory of the vehicle using estimated speeds at each turn point, and then builds a vertical profile for the trajectory. The resulting lateral profile and trajectory may not necessarily achieve a time of travel, a distance, and/or a fuel-efficiency desired for a performance of the vehicle traversing a given number of turn points.

Similarly, one of ordinary skill in the art understands that current solutions, such as without limitation the "Programme for Harmonised ATM Research in Eurocontrol (PHARE) Trajectory Predictor," uses an estimation of the flight phase at each turn point to assume speed estimations at each turn point. The PHARE process and machine build a lateral profile using those speed estimations and then derive therefrom a vertical profile.

In most current Flight Management Systems (FMSs) a lateral and then vertical profile are also completed sequentially in a PHARE-like process. Some FMSs also perform a final optimization step to try to overcome technical problems with efficiencies in deriving an accurate lateral profile for a trajectory of a vehicle. Hence, currently existing lateral profile and trajectory control and/or predictions for a vehicle may not necessarily achieve a time of travel, a distance, and/or a fuel-efficiency desired for a performance of the vehicle along a trajectory traversing a given number of turn points.

Hence, what is needed is a novel process and/or machine that will at least overcome technical problems at least as described above, and other issues. What is needed is a novel process and/or machine that will at least generate trajectory control and/or predictions for a vehicle that provide a guidance and/or control that comprise an accuracy that allows a vehicle to traverse a given number of turn points with at least a desired: time of travel, distance, and/or fuel-efficiency.

SUMMARY

In illustrative examples, a machine and process are shown configured to provide an innovative technical solution that derive a predicted trajectory for a vehicle. The machine may be configured to execute a process for deriving a predicted trajectory for a vehicle, via: a processor executing an algorithm specially programmed for: generating a baseline lateral profile for a baseline trajectory; subsequently generating a baseline vertical profile for the baseline trajectory; subsequently forming the baseline trajectory by merging the vertical profile with the baseline lateral profile; and using at least one of: a performance element, or a configuration element, from the baseline trajectory for deriving the predicted trajectory.

The process for deriving a predicted trajectory for a vehicle may also include: the predicted trajectory including a series of turn points; and generating the baseline lateral profile via using instantaneous changes in a course of the vehicle at each turn point in the series of turn points. The process may also include: respectively retrieving, at each turn point along the baseline trajectory, at least one of: the performance element or the configuration element of the vehicle; and using at least one of: performance element or the configuration element, respectively, computing a turn radius at each turn point; replacing, using the turn radius, the baseline lateral profile with an adjusted lateral profile.

The process for deriving the predicted trajectory for the vehicle may also include: generating, using the adjusted lateral profile, an adapted vertical profile; forming the predicted trajectory by merging the adjusted lateral profile with the adapted vertical profile. The process may also include generating the vertical profile for the baseline trajectory via applying airspace constraints onto the baseline lateral profile. The process may also include subsequent to forming the baseline trajectory, adapting the vertical profile and therefrom deriving the predicted trajectory. The performance element may be a true airspeed. The vehicle may be an aerospace vehicle.

In other illustrative examples, a machine and process are shown configured to provide an innovative technical solution that control a trajectory for a vehicle. The machine may be configured to execute a process for controlling a trajectory for a vehicle via: a processor executing an algorithm specially programmed for deriving a predicted trajectory for the vehicle, via: generating a baseline lateral profile for a baseline trajectory; subsequently generating a vertical profile for the baseline trajectory; subsequently forming the baseline trajectory by merging the vertical profile with the baseline lateral profile; using at least one of: a performance element or a configuration element from the baseline trajectory for deriving the predicted trajectory; sending the predicted trajectory to a guidance control unit for the vehicle; and controlling a performance of the vehicle to follow the predicted trajectory.

The process for controlling the trajectory for the vehicle may also include the predicted trajectory including a series of turn points; and generating the baseline lateral profile via using instantaneous changes in a course of the vehicle at each turn point in the series of turn points. The process may also include: respectively retrieving, at each turn point along the baseline trajectory, at least one of: the performance element or the configuration element of the vehicle; and using at least one of: the performance element or the configuration element, respectively, computing a turn radius at each turn point; replacing, using the turn radius, the baseline lateral profile with an adjusted lateral profile.

The process for controlling the trajectory for the vehicle may also include generating, using the adjusted lateral profile, an adapted vertical profile; forming the predicted trajectory by merging the adjusted lateral profile with the adapted vertical profile. The vehicle may be an aerospace vehicle. Generating the vertical profile for the baseline trajectory may include applying airspace constraints onto the baseline lateral profile. The process may also include subsequent to forming the baseline trajectory, adapting the vertical profile and therefrom deriving the predicted trajectory.

In other illustrative examples, a machine and process are shown configured to provide an innovative technical solution for reducing congestion in an Air Traffic Management system. The machine may be configured to execute a process for reducing congestion in an Air Traffic Management system, via: deriving a predicted trajectory for a vehicle, via: a processor executing an algorithm specially programmed for: generating a baseline lateral profile for a baseline trajectory; subsequently generating a baseline vertical profile for the baseline trajectory; subsequently forming the baseline trajectory by merging the baseline vertical profile with the baseline lateral profile; and using at least one of: a performance element or a configuration element from the baseline trajectory for deriving the predicted trajectory; and receiving and using, in the Air Traffic Management system, the predicted trajectory for the vehicle for deconflicting the predicted trajectory for the vehicle from other predicted trajectories of other vehicles.

The process for reducing congestion in an Air Traffic Management system may also include: the predicted trajectory including a series of turn points; and generating the baseline lateral profile via using instantaneous changes in a course of the vehicle at each turn point in the series of turn points. The process may further include: respectively retrieving, at each turn point along the baseline trajectory, at least one of: the performance element or the configuration element of the vehicle; using at least one of: the performance element or the configuration element, respectively, computing a turn radius at each turn point; and replacing, using the turn radius, the baseline lateral profile with an adjusted lateral profile.

The process for reducing congestion in an Air Traffic Management system may also include: generating, using the adjusted lateral profile, an adapted vertical profile; and forming the predicted trajectory by merging the adjusted lateral profile with the adapted vertical profile. The process may also include: the vertical profile for the baseline trajectory including applying airspace constraints onto the baseline lateral profile, and further including, subsequent to forming the baseline trajectory, adapting the vertical profile and therefrom deriving the predicted trajectory.

The features and functions can be achieved independently in various examples of the present disclosure or may be combined in yet other examples in which further details can be seen with reference to the following description and drawings. One of ordinary skill in the art understands that examples given may be equivalently applied to:

Clause 1: A process for deriving a predicted trajectory for a vehicle, the process comprising:

- a processor executing an algorithm specially programmed for:
  - generating a baseline lateral profile for a baseline trajectory;
  - subsequently generating a baseline vertical profile for the baseline trajectory;
  - subsequently forming the baseline trajectory by merging the vertical profile with the baseline lateral profile; and
  - using at least one of: a performance element, or a configuration element, from the baseline trajectory for deriving the predicted trajectory.

Clause 2: The process of clause 1, further comprising:
- the predicted trajectory comprising a series of turn points; and
- generating the baseline lateral profile via using instantaneous changes in a course of the vehicle at each turn point in the series of turn points.

Clause 3: The process of clause 1, further comprising:
- respectively retrieving, at each turn point along the baseline trajectory, at least one of: the performance element or the configuration element of the vehicle; and
- using at least one of: performance element or the configuration element, respectively, computing a turn radius at each turn point;
- replacing, using the turn radius, the baseline lateral profile with an adjusted lateral profile.

Clause 4: The process of clause 3, further comprising:
- generating, using the adjusted lateral profile, an adapted vertical profile;
- forming the predicted trajectory by merging the adjusted lateral profile with the adapted vertical profile.

Clause 5: The process of clause 1, wherein generating the vertical profile for the baseline trajectory comprises applying airspace constraints onto the baseline lateral profile.

Clause 6: The process of clause 1, further comprising:
- subsequent to forming the baseline trajectory, adapting the vertical profile and therefrom deriving the predicted trajectory.

Clause 7: The process of clause 1, wherein the performance element is a true airspeed.

Clause 8: The process of clause 1, wherein the vehicle is an aerospace vehicle.

Clause 9: A process for controlling a trajectory for a vehicle, the process comprising:
- a processor executing an algorithm specially programmed for deriving a predicted trajectory for the vehicle, via:
  - generating a baseline lateral profile for a baseline trajectory;
  - subsequently generating a vertical profile for the baseline trajectory;
  - subsequently forming the baseline trajectory by merging the vertical profile with the baseline lateral profile;
  - using at least one of: a performance element or a configuration element from the baseline trajectory for deriving the predicted trajectory;
  - sending the predicted trajectory to a guidance control unit for the vehicle; and
  - controlling a performance of the vehicle to follow the predicted trajectory.

Clause 10: The process of clause 9, further comprising:
- the predicted trajectory comprising a series of turn points; and
- generating the baseline lateral profile via using instantaneous changes in a course of the vehicle at each turn point in the series of turn points.

Clause 11: The process of clause 9, further comprising:
- respectively retrieving, at each turn point along the baseline trajectory, at least one of: the performance element or the configuration element of the vehicle; and
- using at least one of: the performance element or the configuration element, respectively, computing a turn radius at each turn point;
- replacing, using the turn radius, the baseline lateral profile with an adjusted lateral profile.

Clause 12: The process of clause 11, further comprising:
- generating, using the adjusted lateral profile, an adapted vertical profile;
- forming the predicted trajectory by merging the adjusted lateral profile with the adapted vertical profile.

Clause 13: The process of clause 9, wherein the vehicle is an aerospace vehicle.

Clause 14: The process of clause 9, wherein generating the vertical profile for the baseline trajectory comprises applying airspace constraints onto the baseline lateral profile.

Clause 15: The process of clause 9, further comprising:
- subsequent to forming the baseline trajectory, adapting the vertical profile and therefrom deriving the predicted trajectory.

Clause 16: A process for reducing congestion in an Air Traffic Management system, the process comprising:
- deriving a predicted trajectory for a vehicle, via:
  - a processor executing an algorithm specially programmed for:
    - generating a baseline lateral profile for a baseline trajectory;
      - subsequently generating a baseline vertical profile for the baseline trajectory;
    - subsequently forming the baseline trajectory by merging the baseline vertical profile with the baseline lateral profile; and
    - using at least one of: a performance element or a configuration element from the baseline trajectory for deriving the predicted trajectory; and
- receiving and using, in the Air Traffic Management system, the predicted trajectory for the vehicle for deconflicting the predicted trajectory for the vehicle from other predicted trajectories of other vehicles.

Clause 17: The process of clause 16, further comprising:
- the predicted trajectory comprising a series of turn points; and
- generating the baseline lateral profile via using instantaneous changes in a course of the vehicle at each turn point in the series of turn points.

Clause 18: The process of clause 16, further comprising:
- respectively retrieving, at each turn point along the baseline trajectory, at least one of: the performance element or the configuration element of the vehicle;
- using at least one of: the performance element or the configuration element, respectively, computing a turn radius at each turn point; and
- replacing, using the turn radius, the baseline lateral profile with an adjusted lateral profile.

Clause 19: The process of clause 18, further comprising:
- generating, using the adjusted lateral profile, an adapted vertical profile; and
- forming the predicted trajectory by merging the adjusted lateral profile with the adapted vertical profile.

Clause 20: The process of clause 16, wherein generating the vertical profile for the baseline trajectory comprises applying airspace constraints onto the baseline lateral profile, and further comprising, subsequent to forming the baseline trajectory, adapting the vertical profile and therefrom deriving the predicted trajectory.

BRIEF DESCRIPTION OF THE DRAWINGS

The illustrative examples, as well as a preferred mode of use, further objectives and features thereof, will best be understood by reference to the following detailed description of an illustrative example of the present disclosure when read in conjunction with the accompanying drawings, wherein.

DETAILED DESCRIPTION

Figure 1:
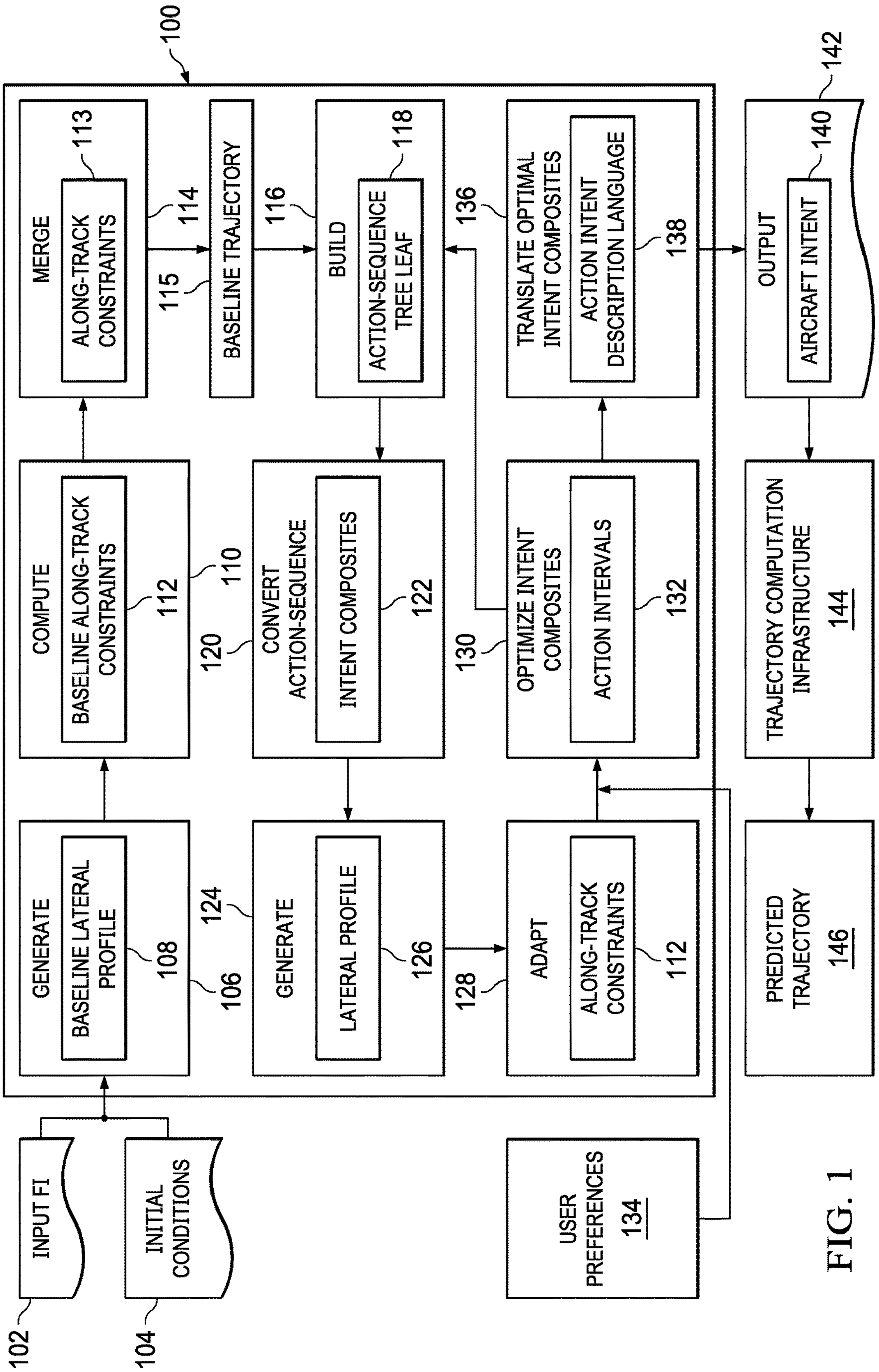
FIG. 1 is an illustration of an Expanded Intent Generation Core Process for deriving a predicted trajectory for a vehicle depicted in accordance with an illustrative example.

Examples herein consider and take into account that, as explained at least in European Patent Application 1438239.1 and U.S. Pat. No. 9,852,640 entitled "Method for Creating and Choosing a Determinate Piloting Strategy," issued to The Boeing Company and hereby fully incorporated herein, that determining the lateral (also referred to as horizontal) profile and the vertical profile for an aerospace vehicle is a complex task. Examples herein consider and take into account that the task is complicated at least because there are different kinds of constraints that cannot be addressed independently, as they are interrelated and that determining the lateral profile and the vertical profile for an aerospace vehicle should ensure compliance with the aerospace vehicle performance characteristics. Hence, a technological problem of existing systems providing a process and/or machine to generate a control and/or a prediction of a trajectory for a vehicle is that a need still exists for a novel process and/or machine to generate a control and/or a prediction of a trajectory for a vehicle that provide a guidance and/or control that comprise an accuracy that allows the vehicle to traverse a given number of turn points with a desired time of travel, distance, and/or fuel-efficiency. Thus, a technological problem exists wherein existing solutions fail to allow generating both the lateral and vertical profiles independently and later adjusting them to take into consideration the real interactions and limitations between the two, without a need for, and an inaccuracy caused by, speed estimations when building the lateral profile.

Examples described herein consider and take into account that a technological problem exists in existing solutions providing a process and/or machine to generate a control and/or a prediction of a trajectory for a vehicle that provide a guidance and/or control that comprise an accuracy that allows the vehicle to traverse a given number of turn points with a desired time of travel, distance, and/or fuel-efficiency. Further, examples of the novel process and machine described herein consider and take into account that when computing aircraft intent, most methods widely used currently in the aviation industry decouple the lateral profile generation from the vertical profile generation, in order to simplify the generation process. The term aircraft intent is used to describe configurable parameters of an aircraft that generate a trajectory for an aerospace vehicle. The aerospace vehicle, without limitation may include a commercial aircraft, an unmanned air system, and/or a military aircraft. As described in European Patent Application 0738029.7 and U.S. Pat. No. 9,250,099, entitled "Predicting Aircraft Trajectory," assigned to The Boeing Company and hereby fully incorporated herein, aircraft intent is expressed using a set of parameters presented so as to allow equations of motion to be solved. The theory of formal languages may be used to implement this formulation: an aircraft intent description language provides the set of instructions and the rules that govern the allowable combinations that express the aircraft intent, and so allow a prediction of the aircraft trajectory.

Thus, the term aircraft intent may define a representation of the future actions and/or piloting strategy for an aerospace vehicle, that determines a desired trajectory of the aerospace vehicle that fulfills the certain given constraints and/or objectives for a performance/movement of the aerospace vehicle along a trajectory predicted therefrom. Hence a desired computed trajectory that meets all given constraints and/or objectives for a performance/movement of the aerospace vehicle along a series of turn points may also be called a predicted trajectory for a given aircraft intent. The predicted trajectory described as a computed trajectory such as explained at least in EP Patent Application 0738029.7 and U.S. Pat. No. 9,250,099 as Description of Computed Trajectory 122, previously fully incorporated herein. Hence, defining an aircraft intent to meet established certain constraints and/or objectives for an aerospace vehicle is a step required before computing its predicted trajectory. Further still, one of ordinary skill in the art understands that the concepts described herein for the aircraft intent, and the aircraft intent description language, may also be adapted to apply to guidance and/or control and predictions for a trajectory for any object governed by equations of motion.

The novel technological improvements described herein describe a new process and machine that at least allow a decoupling of a lateral profile and a vertical profile calculation for the aircraft intent without compromising an ability to consider interactions between the lateral profile and the vertical profile. The novel technological improvements described herein describe a new process and machine that overcome current technical deficiencies in current processes that generate a lateral profile and, when that is complete, generate the vertical profile on top of it.

Examples described herein consider and take into account that when computing aircraft intent, current systems generate a lateral profile by determining a radius at every turn point that limits a range of speeds and/or other performance elements of the aerospace vehicle during such turns. Performance elements may include without limitation: an altitude, a thrust setting, a heading, a pitch, a roll, a yaw, a weight, a normal load, a thrust setting, deployment of lift alteration devices, and/or other performance elements and/or configurations for the aerospace vehicle. Configuration changes for an aerospace vehicle may include without limitation: deployment of a drag and/or a lift device, extension of landing gear and/or lights, deflection of a control that changes a pitch, yaw, and/or roll of the aerospace vehicle.

As used herein, a turn point refers to a waypoint along a track at which a course of a vehicle traveling along the track changes. Waypoints are described at least in European Application 13382171.0 and U.S. Pat. No. 9,135,828, which are fully incorporated herein.

To avoid choosing any radii that would not allow the most likely speeds during vertical profile generation, current existing systems generating a lateral profile choose radii for turn points based on rough estimations of the likely speed of the aircraft at each turn point based on the constraints of the airspace, the capabilities of the aircraft and the phase of flight. However, making these estimations can be difficult, and they are not always accurate or precise. This makes these methods used by current systems more conservative than may be desired for optimal operations, wherein a resulting lateral profile is feasible, but not necessarily efficient in terms of fuel use, distance traveled, time required, and/or other performance parameters.

Examples of the novel process and machine described herein consider and take into account that constraints may exist on a vertical profile for a desired trajectory for an aerospace vehicle. Without limitation, vertical constraints may include limits on a speed or an altitude for the aerospace vehicle. Vertical constraints may also exist on ranges of values for, without limitation, an altitude, a weight, a normal load, a thrust setting, deployment of lift alteration devices, and/or other performance elements and/or configurations for the aerospace vehicle.

Examples of the novel process and machine described herein consider and take into account and recognize that many of the constraints on the vertical profile may not be certain until the lateral profile has been defined. Constraints on the vertical profile may not be known, at least because constraints on the vertical profile are often the result of intersecting the lateral profile with constraints determined by usable airspace restrictions on the trajectory of the aerospace vehicle. The novel technological improvements described herein describe a new process and machine that may generate an aircraft intent through an improved and expanded process that may be considered inverted relative to current processes, that is, by generating a vertical profile first, and then finalizing the lateral profile for a predicted trajectory for an aerospace vehicle.

Examples of the novel process and machine described herein consider and take into account that some current processes build the lateral and vertical profiles simultaneously but are usually non-deterministic and lack clarity indicating an intent of choices made for the proposed aircraft behavior and/or configuration. Moreover, the results of these such processes tend to be significantly different from what a human pilot would do in the same scenario. These methods are rarely used in any commercial system for these same reasons.

Examples described herein consider and take into account that what is needed to overcome technological limitations of inaccuracies and/or inefficiencies is a process and machine that further simplifies the aircraft intent generation for a vehicle as described in the Modular Intent Generation Infrastructure process based on: Flight Intent Description Language, Intent Composite Description Language, and Aircraft Intent Description Language, as described at least in: "Method for Creating and Choosing a Determinate Piloting Strategy for an Aircraft," European Patent Application No. 14382391.2 and U.S. Pat. No. 9,852,640 assigned to The Boeing Company, which are fully incorporated herein. European Patent Application No. 14382391.2 and U.S. Pat. No. 9,852,640 reference disclosures found in European Patent Applications: 0738029.7, 11382020.3, 12382196.9, and 12382195.1, which are claimed respectively by U.S. Pat. Nos. 9,020,662; 9,153,136; 8,744,649; and 8,977,411, all of which are hereby fully incorporated herein.

Likewise, examples described herein consider and take into account that what is needed to overcome technological limitations of inaccuracies and/or inefficiencies is a process and machine that further simplifies the generation of a description of computed trajectory 122 as explained at least in: "Providing Data for Predicting Aircraft Trajectory," European Patent Application No. 11382020.3 of The Boeing Company, filed Jan. 28, 2011, and U.S. Pat. No. 9,153,136, previously incorporated herein; and Aircraft Intent Description Language described at least in "Predicting Aircraft Trajectory," European Patent Application No. 07380259.7 of The Boeing Company filed on Sep. 21, 2007 and granted on May 16, 2012, and U.S. Pat. No. 9,250,099, also previously incorporated herein.

Thus, the examples presented herein provide a technological improvement beyond the process and machine described by European Patent Application No. 14382391.2 and U.S. Pat. No. 9,852,640 assigned to The Boeing Company and entitled "Method for Creating and Choosing a Determinate Piloting Strategy," and fully incorporated herein, that at least provides a new process and machine that allows the decoupling of the lateral and vertical profile calculations for an aircraft intent without compromising the ability to consider the interactions between the lateral and vertical profile. Hence, examples described herein provide and improvement, over the process and machine described by European Patent Application No. 14382391.2 and U.S. Pat. No. 9,852,640 assigned to The Boeing Company at least in generating a control and/or a prediction of a trajectory for a vehicle that provide a guidance and/or control that comprise an accuracy that allows a vehicle to traverse a given number of turn points with a desired time of travel, distance, and/or fuel-efficiency.

The examples herein also recognize and take into account, as described at least in the following U.S. patents issued to The Boeing Company, and fully incorporated herein: U.S. Pat. Nos. 9,250,099; 9,153,136; 9,135,828; 9,020,662, and U.S. patent application Ser. No. 16/715,850; that a control element on an aerospace vehicle may include an element that may control, without limitation, a movement, a trajectory, a configuration, an energy state, an orientation, a location in space, or combinations thereof, for the aerospace vehicle. A control element may include, without limitation, a control surface, an engine, some other system on the aerospace vehicle, or combinations thereof.

Command of the control surface of an aerospace vehicle may be executed through mechanical connections between a control input unit and the control element. A control element may include any part of the aerospace vehicle that may control a state of the aerospace vehicle. Mechanical linkages may include mechanical mixers configured to apply control laws and/or gain and/or control load feel between the control input unit and the control surface.

Additionally, command of the control surface for an aerospace vehicle may be executed through a control augmentation system. A control augmentation system may include, without limitation, a digital control system. A digital control system may be, without limitation, a fly-by-wire (FBW) system. The control augmentation system may augment or replace mechanical flight controls of an aerospace vehicle with an electronic interface. As such, a control input unit may not be physically connected to the control surface, engine, or other system by cables, linkages, or other mechanical systems. Instead, the commands from a control input unit are converted to electronic signals transmitted by wires, optical fibers, over an air-interface, or some combination thereof, to an actuator at the control surface, engine, or other system.

A flight control computer may generate commands to a control element that may include a flight control surface, an engine, or other devices that control movement of the aerospace vehicle. A flight control computer in a control augmentation system may incorporate a processor programmed with some control laws to regulate stability, damping, responsiveness, or combinations thereof for the aerospace vehicle. With control augmentation, some commands to the control surface, engine, or other system, are not specifically directed by an input from a pilot to the control input unit, but are determined by a flight control computer in the control augmentation system. A load alleviation sub-system may be a part of or interface with the flight control computer and/or the control augmentation system.

The different components in a control augmentation system may communicate with each other using different types of communications architectures. A control augmentation system may use a data bus, such as those used in computer systems. The data bus may reduce the amount of wiring between components. Depending on the amount of traffic on the data bus, commands may reach intended components later than desired. A network may be used in addition to or in place of a data bus system to provide communications between processors, actuator control modules, and/or flight control modules.

Additionally, governmental airworthiness certification requirements may establish performance characteristics required for an aerospace vehicle under various operating conditions. The dynamic analysis may take into account unsteady aerodynamic characteristics and all significant structural degrees of freedom including rigid body motions. The limit loads may be determined for all critical altitudes, weights, and weight distributions as specified at least in U.S. Federal Aviation Regulation § 25.321 (b), and all critical speeds within the ranges indicated at least in U.S. Federal Aviation Regulation § 25.341 (b) (3).

As a non-limiting example, commands to a control element for the aerospace vehicle may be constrained, such that regardless of an input received from a control input unit during flight through a particular flight region, commands to a control element would not exceed commanding a constrained level of change in order to prevent effects of an instrumentation error and/or aerodynamic effects not fully accounted for in an aerodynamic database or full control laws of the aerospace vehicle from causing an exceedance of a structural limit for the aerospace vehicle. Hence, the aerospace vehicle may also suffer a technological problem of being constrained from utilizing a full structural envelope of the aerospace vehicle in the flight region for which commands have been constrained. In other words, as a non-limiting example, instead of being able to command a maneuver for the aerospace vehicle fully to a structural limit during flight in the particular flight region, the command is constrained from reaching the control element and thus the operating envelope of the aerospace vehicle may be reduced from its originally designed structural limits.

Therefore, it would be desirable to have a machine and/or process that take into account at least some of the issues discussed above, as well as other possible issues. For example, it would be desirable to have a machine and/or process that reduce issues that limit an aerospace vehicle's available operating envelope due to unintended, undesirable, and/or inconsistent loads on a part of the aerospace vehicle due to a wind gust.

In contrast to current constraints on an operating envelope, examples illustrated herein can be attached to an aerospace vehicle and provide a predicted trajectory for the aerospace vehicle that is more accurate and thus provides greater efficiencies than currently existing processes and machines.

The illustrative examples also recognize and take into account that existing systems attempting to predict a trajectory for an aerospace vehicle may benefit from an improvement to generating a control and/or a prediction of a trajectory for a vehicle that can provide a guidance and/or control that comprise an improved accuracy that allows a vehicle to traverse a given number of turn points with a desired time of travel, distance, and/or fuel-efficiency.

In contrast, the illustrative examples herein can be added as an adaptor to an existing control system and thus can overcome the technological limitations of currently existing Air Traffic Management systems and/or aerospace vehicles for deriving an aircraft intent and resultant predicted trajectory, at least as referenced above. In other words, even if it only becomes apparent that an aerospace vehicle and/or an air traffic management system requires a more accurate and/or timely predicted trajectory for an aerospace vehicle after the aerospace vehicle and/or the air traffic management system are in operation, the examples for a process and a machine described herein may be added on to existing systems configured to receive and process a predicted trajectory of the aerospace vehicle. One of ordinary skill in the art understands that an air traffic management system may require a more accurate and/or timely predicted trajectory for an aerospace vehicle in order to more efficiently manage air traffic and/or reduce congestion in a given airspace at least by increasing an accuracy and capability to deconflict the predicted trajectory for the aerospace vehicle from other predicted trajectories of other aerospace vehicles.

FIG. 1 is an illustration of an Expanded Intent Generation Core Process for deriving a predicted trajectory for a vehicle depicted in accordance with an illustrative example. More specifically, Expanded Intent Generation Core Process 100 in FIG. 1 expands upon the Intent Generation Core Process shown by FIG. 1 in European Patent Application No. 14382391.2 and U.S. Pat. No. 9,852,640 assigned to The Boeing Company. In contrast to the Intent Generation Core Process shown by FIG. 1 in European Patent Application No. 14382391.2 and U.S. Pat. No. 9,852,640 that commences by generating a horizontal profile directly from flight intent 102 input, the Expanded Intent Generation Core Process 100 in FIG. 1 of the present application begins with a preliminary step 106 of generating a baseline lateral profile 108. In contrast to the horizontal profile of European Patent Application No. 14382391.2 and U.S. Pat. No. 9,852,640 that uses traditional estimations of a turn radius at each turn point being based upon estimations of a speed range of a vehicle as it approaches each turn point to generate a horizontal profile, the baseline lateral profile 106 is generated using an instantaneous (no turn radius—shown by line 202 in FIG. 2) change of course directly from one turn point to a next turn point along a track. Next, in step 110, along-track constraints 112 for baseline lateral profile 108 are computed using technics described at least by European Patent Application 1438239.1 and U.S. Pat. No. 9,852,640 and European Patent Application 0738029.7 and U.S. Pat. No. 9,250,099 incorporated herein. Without limitation, computing along-track constraints 112 may include applying airspace constraints onto baseline lateral profile 108. Step 110 may also be referred to as generating a baseline vertical (also called longitudinal) profile, or more particularly at this point, along-track constraints 112 represent a baseline vertical profile derived using baseline lateral profile 108. See at least FIG. 5 and descriptions thereof in European Patent Application 1438239.1 and U.S. Pat. No. 9,852,640.

In step 114, baseline along-track constraints (baseline vertical profile) 112 are then merged with baseline lateral profile 108. In other words, at step 114 baseline vertical profile 112 is merged with the baseline lateral profile 108. In a manner similar to the action sequences tree leaf building described for Intent Generation Core Process shown by FIG. 1 in European Patent Application No. 14382391.2 and U.S. Pat. No. 9,852,640, step 116 then uses the merged along-track constraints 113 from step 114 to build an action sequences tree leaf 118, that is then converted at step 120 into intent composites 122. Merged along track constraints intent composites 122 are formed with Intent Composite Description Language in a manner described at least in European Patent Application 14382195.1 and U.S. Pat. No. 8,977,411.

At step 124, the Expanded Intent Generation Core Process 100 in FIG. 1 of the present application adds another expansion beyond the Intent Generation Core Process shown by FIG. 1 in European Patent Application No. 14382391.2 and U.S. Pat. No. 9,852,640. One of ordinary skill in the art understands that the Intent Composite Description Language generated for the intent composites 122 at step 120 describes a track that has no turn radii because baseline lateral profile 108 was composed using instantaneous course changes. At step 124, lateral profile 126 is then generated by using speeds from intent composites 122 at each turn point to generate a turn radius, respectively, at each turn point. For an aerospace vehicle, such as without limitation an aircraft, the speed provided by the intent composites 122 may be a true airspeed. Thus, lateral profile 126 may also be considered an adjusted lateral profile relative to baseline lateral profile 108.

Not only a speed from intent composites 122 may be used to generate the turn radius, respectively, at each turn point. Intent composites 122 may comprise, in addition to a speed at each turn point, a full collection of values for performance elements and configuration elements of the aerospace vehicle. A configuration element may be a description of a state for some element of a configuration of the vehicle, such as without limitation: a drag and/or a lift device, extension of landing gear and/or lights, deflection of a control that changes a pitch, yaw, and/or roll of the aerospace vehicle.

Step 124 may operate using specially programmed algorithms in a processor that use some performance element other than, and/or in conjunction with the speed, and/or configuration element of the aerospace vehicle. Hence, one or several elements such as, without limitation: an altitude, a weight, a normal load, a thrust setting, deployment of lift alteration devices, and/or other performance elements and/or configurations, may be used to generate a turn radius at each turn point on lateral profile 126 that differs from the instantaneous change of course that differs from baseline lateral profile 108. The turn radius at each turn point on lateral profile 126 will also differ from and be more precise and hence more efficient than estimated turn radii used by other currently existing trajectory programs, including at least those mentioned above.

At least because lateral profile 126 will be a different length than baseline lateral profile 108 due to added turn radii that alter along-track distances between turn points, adaptations of along-track constraints (also known as vertical profile) 112 will be needed to ensure compliance at least with flight intent 102. Hence, step 128 adapts baseline vertical profile (along-track constraints) 112 based upon lateral profile 126 differences from baseline lateral profile 108 and similar to prior step 114, now merges the resultant adapted baseline vertical profile with lateral profile 126. Hence, this process essentially inverts the process of aircraft intent generation described in European Patent Application No. 14382391.2 and U.S. Pat. No. 9,852,640, by starting with a vertical profile to determine speeds and/or other performance and/or configuration elements to use to define specific turn radii that establish a horizontal profile instead of determining a vertical profile after setting a lateral profile based on estimated ranges for speeds at each turn point.

Step 128 produces intent composite description language for the merger of the resultant adapted baseline vertical profile with lateral profile 126. Step 130 optimizes action intervals 132 in the intent composite description language based upon user preferences 134 and optimization criteria as described in European Patent Application No. 14382391.2 and U.S. Pat. No. 9,852,640. The optimization of step 130 may be an iterative process that recycles through steps 116 to 128 until no further optimization is possible for any action interval of the intent composite description language produced by step 128.

When the optimization of step 130 is complete, step 136 translates the intent composite description language produced by step 130 into aircraft intent description language 138 that describes aircraft intent 140 for the vehicle that is output at step 142. Aircraft intent 140 is then available for processing by trajectory computation infrastructure 144 to produce predicted trajectory 146 for application at least by a Flight Management System or an Air Traffic Management, such as without limitation Flight Management System 222 or Air Traffic Management 224 as shown at least in European Patent 0738029.7 and U.S. Pat. No. 9,020,662, previously incorporated herein.

In other words, aircraft intent 140 from Expanded Intent Generation Core Process 100 shown above may be used as aircraft intent 114 shown in European Patent Application 07380259.7 and U.S. Pat. No. 9,250,099 at least to form an improved (by using lateral profile 126 described in FIG. 1 above) predicted trajectory as shown by the process of trajectory computation infrastructure 100 in European Patent Application 07380259.7 and U.S. Pat. No. 9,250,099 forming description of computed trajectory 122 in European Patent Application 07380259.7 and U.S. Pat. No. 9,250,099. As trajectory computation infrastructure 100 is described in European Patent Application 07380259.7 and U.S. Pat. No. 9,250,099, trajectory computation infrastructure 144 may be a specially programmed processor that is a part of or in communication with guidance and/or control system 210 described below for FIG. 2.

Figure 2:
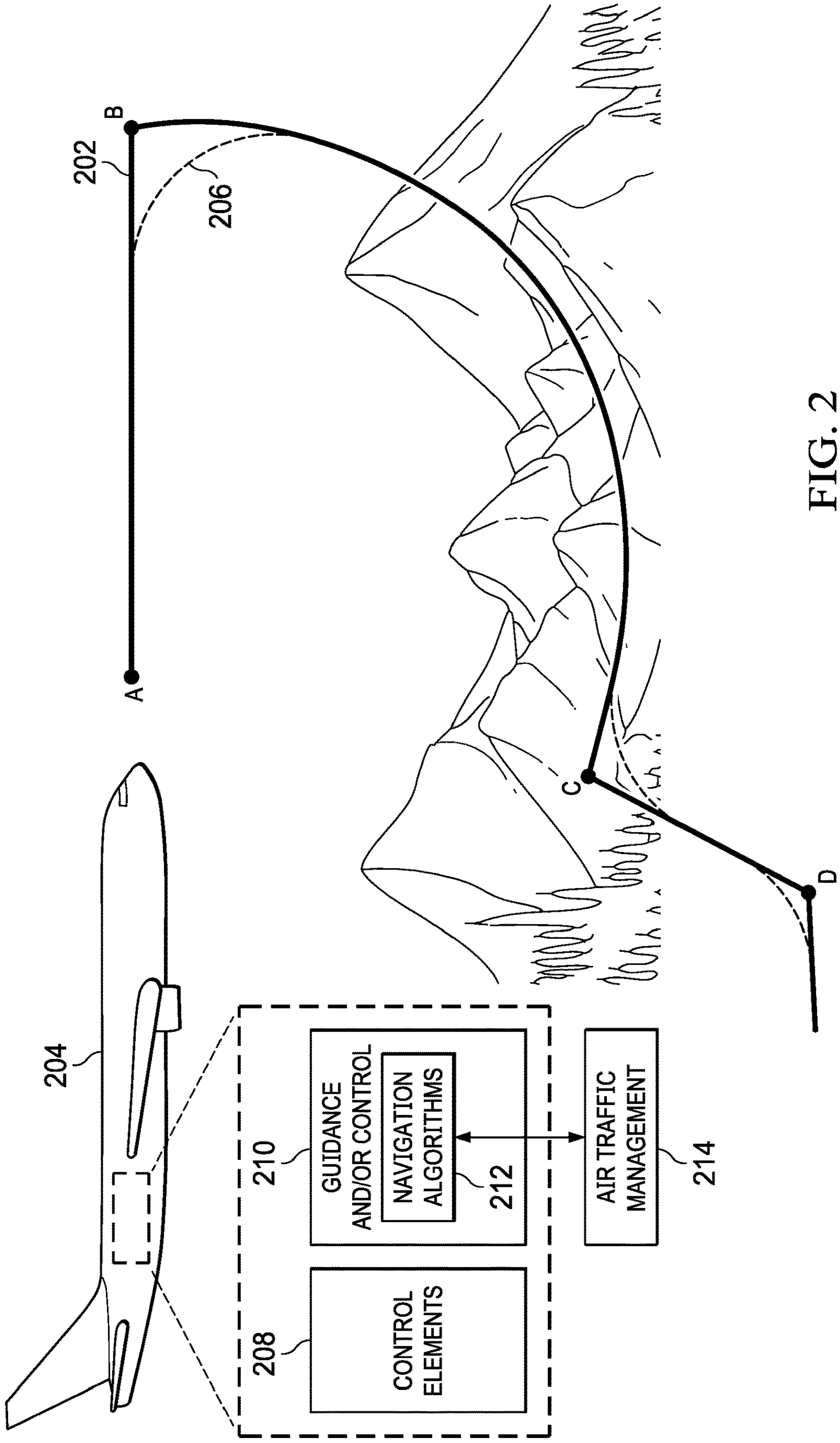
FIG. 2 is a perspective view of profiles for a track for a vehicle, in accordance with an illustrative example.

Looking now to FIG. 2, FIG. 2 is a perspective view of profiles for a track for a vehicle, in accordance with an illustrative example. More specifically, track 202 is a solid line that provides an illustration for vehicle 204 of baseline lateral profile 108 as well as representing baseline lateral profile 108 and baseline vertical profile 112 merged to form baseline trajectory 115 as discussed above. Baseline lateral profile 108 incorporated into track 202 illustrates a course that transitions between turn points instantaneously—without a turn radius.

Track 206 overlies track 202 except at dashed lines shown near turn points that illustrate turn radii of lateral profile 126 discussed above. The turn radii that differ on track 206 from track 202 may be derived from speeds and/or other performance and/or configuration elements of vehicle 204 as taken from merged baseline lateral profile 106 and baseline vertical profile 112 discussed above. Track 206 provides a visualization for lateral profile 126 discussed above and used to derive novel aircraft intent 140 as described above, which is used to derive a predicted trajectory for vehicle 204 as described at least by: European Patent Application 12382196.9 and U.S. Pat. No. 8,744,649; and European Patent Application 07380259.7 and U.S. Pat. No. 9,250,099, all previously incorporated herein.

Without limitation, vehicle 204 may be an aerospace vehicle, such as without limitation an aircraft, manned or unmanned. Vehicle 204 may contain control elements 208 used to alter a configuration and/or a performance of vehicle 204 in any of 4 dimensions. Control elements 208 may be controlled by a guidance and/or control system 208. Guidance and/or control system 210 may contain navigation algorithms 212 within a processor configured with specially programmed code configured to execute the Expanded Intent Generation Core Process 100 disclosed above. Hence, Expanded Intent Generation Core Process 100 may be executed for and/or within vehicle 204. One of ordinary skill in the art understands that while the example shows vehicle 204 as an airframe, that vehicle 204 may represent any object whose trajectory may be described with equations of motion.

Guidance and/or control system 210 and/or navigation algorithms 212 thereof may also be configured to execute the processes described at least for intent generation infrastructure 103 and/or trajectory computation infrastructure 110 disclosed at least by European Patent Application 12382196.9 and U.S. Pat. No. 8,744,649, previously incorporated herein. Guidance and/or control system 210 and/or navigation algorithms 212 therefor may also be configured to execute the processes described at least for trajectory computation infrastructure 100 and/or computer implemented 211 method as disclosed by at least European Patent Application 07380259.7 and U.S. Pat. No. 9,250,099, previously incorporated herein.

FIG. 2 also shows that, as described above and similarly described in European Patent Application 07380259.7 and U.S. Pat. No. 9,250,099, that aircraft intent 140 may be transmitted for use by a Flight Management System within vehicle 204 and/or by Air Traffic Management 214. A Flight Management System within vehicle 204 may without limitation be a part of and/or associated with guidance and/or control system 210. Hence, predicted trajectory 146 may be used by a Flight Management System within vehicle 204 and/or by Air Traffic Management 214 at least as described in European Patent Application 0738029.7 and U.S. Pat. No. 9,250,099, entitled "Predicting Aircraft Trajectory," assigned to The Boeing Company and previously fully incorporated herein, for at least one of guiding and/or controlling a trajectory for a vehicle. With the technological benefit of predicted trajectory 146 provided by Expanded Intent Generation Core Process 100, Air Traffic Management and Flight Management Systems may improve their accuracy and efficiency in utilizing airspace and assuring aircraft separation and thereby solving technological needs at least as described above.

Guidance and/or control system 210 may be programmed and operate for controlling at least control elements 208 for controlling a performance of vehicle 204 to follow predicted trajectory 146 in operation. Guidance and/or control system 210 is not limited to a location as simply depicted on FIG. 2. Guidance and/or control system 210 may be a stand alone unit, such as without limitation a line replaceable unit, and/or be a part of another unit and/or processor, and/or be special program code within a stand alone unit, such as without limitation a line replaceable unit, and/or another unit and/or processor.

Accordingly, guidance and/or control system 210 may be located: beneath, on, or above the earth's surface. Hence, transmissions to and from guidance and/or control system 210 may be, without limitation to and from: components on vehicle 204, and/or between vehicle 204 and without limitation: a space based location such as without limitation a satellite, another aerospace vehicle such as without limitation an aerospace vehicle, a surfaced based facility such as without limitation a structure and/or a vehicle, and/or a subterranean or submarine facility such as without limitation a structure and/or a vehicle.

Similarly, Air Traffic Management 214 is not limited to a location as simply depicted on FIG. 2. Air Traffic Management 214 components likewise may be located: beneath, on, or above the earth's surface. Hence, transmissions to and/or from Air Traffic Management 214 may be, without limitation to and/or from: a space-based location such as without limitation a satellite, another aerospace vehicle such as without limitation an aerospace vehicle, a surfaced based facility such as without limitation a structure and/or a vehicle, and/or a subterranean or submarine facility such as without limitation a structure and/or a vehicle.

One of ordinary skill in the art understands, that although the descriptions herein address the movement of a vehicle and predicting a trajectory therefor, that the process driven by a novel algorithm programmed for execution in a specially programmed processor described herein may be adapted to apply to predict a trajectory for any object governed by equations of motion.

One of ordinary skill in the art also understands that the process and/or machine of the illustrative examples may also include processor and/or communication fabric configured to communicate the prediction of the aircraft intent and/or trajectory of the vehicle to another object and/or location. The machine of the illustrative example may also include the predictor configured to receive an input for a desired maneuver for the aerospace vehicle and, based upon the input, derive an aircraft intent and/or predicted trajectory for the aerospace vehicle at a time in the future. One of ordinary skill in the art also understands that the term aircraft intent can be adapted to apply to any object whose trajectory is governed by equations of motion.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In the illustrative examples, the hardware for the processor units may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices that may be used for processor units include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Figure 3:
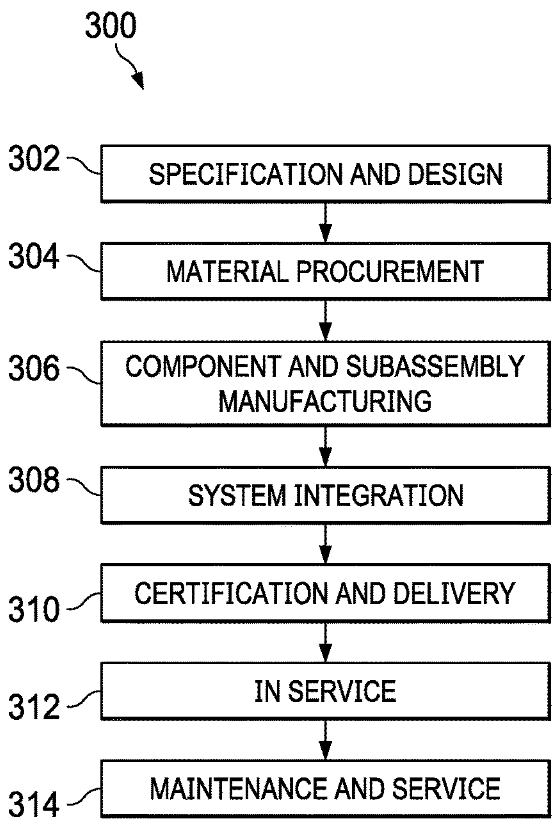
FIG. 3 is an illustration of a block diagram of a vehicle manufacturing and service method in accordance with an illustrative example.
Figure 4:
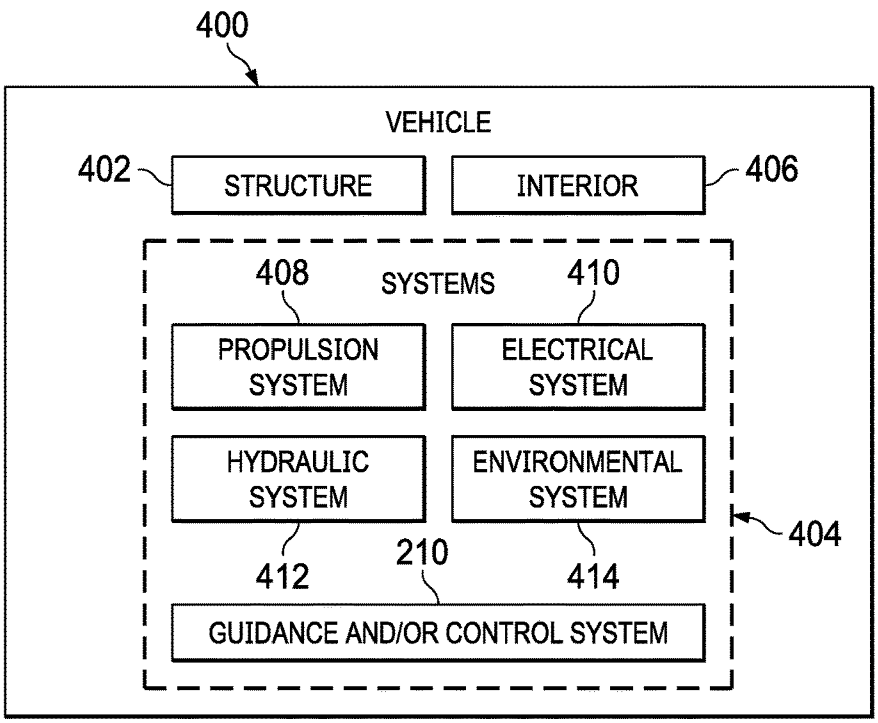
FIG. 4 is an illustration of a block diagram of a vehicle in accordance with an illustrative example.

The process and machine described herein may be applied to modify and improve equipment on an existing vehicle, but may also be incorporated into new processors and/or other components on and/or for movement of a newly designed vehicle and/or object. Hence, the illustrative examples of the disclosure may be described at least in the context of a vehicle manufacturing and service process 300 as shown in FIG. 3 and vehicle 400 as shown in FIG. 4. Vehicle 400 is representative of vehicle 204 of FIG. 2. Without limitation, vehicle 400 may be an aircraft. Without limitation, vehicle 400 may be a transport aircraft.

Turning first to FIG. 3, an illustration of a block diagram of a vehicle manufacturing and service process is depicted in accordance with an illustrative example. During pre-production, vehicle manufacturing and service process 300 may include specification and design 302 and material procurement 304 of vehicle 400 in FIG. 4 and/or of components thereof including at least without limitation guidance and/or control system 210.

During production, component and subassembly manufacturing 306 and system integration 308 of vehicle 400 in FIG. 4 takes place. Thereafter, vehicle 400 in FIG. 4 may go through certification and delivery 310 in order to be placed in service 312. While in service 312 by a customer, vehicle 400 in FIG. 4 may be scheduled for maintenance and service 314, which may include modification, reconfiguration, refurbishment, and other maintenance or service.

Each of the processes of aerospace vehicle manufacturing and service process 300 may be performed or carried out by a system integrator, a third party, an operator, or some combination thereof. In these examples, the operator may be a customer. For the purposes of this description, a system integrator may include, without limitation, any number of aerospace vehicle manufacturers and major-system subcontractors; a third party may include, without limitation, any number of vendors, subcontractors, and suppliers; and an operator may be an airline, a leasing company, a military entity, a service organization, and so on.

With reference now to FIG. 4, an illustration of a block diagram of an aerospace vehicle is depicted in which an illustrative example may be implemented. In this example, vehicle 400 is produced by vehicle manufacturing and service process 300 in FIG. 4 and may include structure 402 with plurality of systems 404 and interior 406. Non-limiting examples of systems 404 include one or more of propulsion system 408, electrical system 410, hydraulic system 412, environmental system 414, and guidance and/or control system 210. Any number of other systems and/or subsystems may be included.

Although an aerospace example is shown, different illustrative examples may be applied to other industries involved with structures that experience a fluid flow and/or surface loading, such as without limitation the automotive and/or the marine industry, as well as fixed structures experiencing fluid flows, such as without limitation a bridge piling or an office building. Hence, the illustrative examples herein represent a machine and process that provides a technical improvement guidance and/or control and/or prediction of a trajectory of an object. In other words, without limitation, vehicle 204 could be without limitation an aerospace vehicle and/or a marine vehicle. Accordingly, without limitation guidance and/or control system 210 may equally apply to a vehicle other than of an aerospace vehicle.

The machine and process embodied herein may be employed during at least one of the stages of aerospace vehicle manufacturing and service method 300 in FIG. 3. One or more apparatus examples, method examples, or a combination thereof may be utilized during production stages, such as component and subassembly manufacturing 306 and system integration 308 in FIG. 3. One or more apparatus examples, method examples, or a combination thereof may be utilized while vehicle 400 is in service 312, during maintenance and service 314 in FIG. 4, or both. The use of a number of the different illustrative examples may substantially expedite the assembly of vehicle 400, reduce the cost of vehicle 400, or both expedite the assembly of vehicle 400 and reduce a production and/or operating cost of vehicle 400.

Hence, FIGS. 1-2 above describe at least a system, that includes an illustrative example of a machine and a process that may include and/or utilize at least: a sensor configured to record and/or derive a performance element; a control element on the aerospace vehicle configured to change a load on a part of the aerospace vehicle; a guidance and/or control system 210 that may include a processor that may be specially programed as a predictor that may include a program code that may include an algorithm that may include rules configured to convert parameters from a state sensed and/or computed into a prediction, for a future time, of aircraft intent and a trajectory of the aerospace vehicle. Control elements 208 may include, without limitation, any surface and/or device that may control a load on a part of vehicle 204. Thus, one of ordinary skill in the art recognizes that the novel machine and process shown in examples above may be considered: an integral part of vehicle 204, and/or to be a component of and/or an added augmentation to vehicle 204, or as a machine separated from vehicle 204 that is associated with and services vehicle 204, and associated operations such as without limitation systems for Air Traffic Management 214.

Thus, the illustrative examples show a process and machine that increases efficiency and operational reliability for a vehicle by providing a more accurate prediction for a trajectory of the vehicle as compared to current systems. At least because the machine and process shown by examples herein provide a precise prediction for a trajectory of a vehicle, it can preempt and prevent or minimize an undesired state for the vehicle, such as without limitation an undesired position in an air traffic environment. Without limitation an undesired position in an air traffic environment may be a location that provides less than desired separation from another vehicle or other type obstacle. Thus, the illustrative examples described herein provide technical benefits that may allow for a reduction in margins of separation between a vehicle and another vehicle or other type obstacle. One of ordinary skill in the art understands that the technical benefits of the illustrative examples described herein provide further technical benefits of improved fuel efficiency and/or other operating performance for a vehicle, as well as reduced time and cost for materials and manufacturing and/or upgrading of a machine and process for predicting at least aircraft intent and trajectory for at least an aerospace vehicle.

Thus, the illustrative examples provide a method and apparatus for managing trajectory prediction for guidance and/or control commands to control elements on an aerospace vehicle. Without limitation, one or more illustrative examples may provide an algorithm that may be applied to adapt and improve a guidance and/or control system for a vehicle. Without limitation, one or more illustrative examples may use a digital control augmentation system. Without limitation, one or more illustrative examples may use a digital fly-by-wire systems for the aerospace vehicle.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

The illustrations of FIGS. 1-4 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

What is claimed is:

1. A process for deriving a predicted trajectory for a vehicle, the process comprising:
- a processor executing an algorithm specially programmed for:
  - generating a baseline lateral profile for a baseline trajectory;
  - subsequently generating a baseline vertical profile for the baseline trajectory;
  - subsequently forming the baseline trajectory by merging the baseline vertical profile with the baseline lateral profile; and
  - using at least one of: a performance element, or a configuration element, from the baseline trajectory for deriving the predicted trajectory.

2. The process of claim 1, further comprising:
- the predicted trajectory comprising a series of turn points; and
- generating the baseline lateral profile via using instantaneous changes in a course of the vehicle at each turn point in the series of turn points.

3. The process of claim 1, further comprising:
- respectively retrieving, at each turn point along the baseline trajectory, at least one of: the performance element or the configuration element of the vehicle;
- using at least one of: performance element or the configuration element, respectively, computing a turn radius at each turn point; and
- replacing, using the turn radius, the baseline lateral profile with an adjusted lateral profile.

4. The process of claim 3, further comprising:
- generating, using the adjusted lateral profile, an adapted vertical profile; and
- forming the predicted trajectory by merging the adjusted lateral profile with the adapted vertical profile.

5. The process of claim 1, wherein generating the vertical profile for the baseline trajectory comprises applying airspace constraints onto the baseline lateral profile.

6. The process of claim 1, further comprising:
- subsequent to forming the baseline trajectory, adapting the vertical profile and therefrom deriving the predicted trajectory.

7. The process of claim 1, wherein the performance element is a true airspeed.

8. The process of claim 1, wherein the vehicle is an aerospace vehicle.

9. A process for controlling a trajectory for a vehicle, the process comprising:
- a processor executing an algorithm specially programmed for deriving a predicted trajectory for the vehicle, via:
  - generating a baseline lateral profile for a baseline trajectory;
  - subsequently generating a vertical profile for the baseline trajectory;
  - subsequently forming the baseline trajectory by merging the vertical profile with the baseline lateral profile;
  - using at least one of: a performance element or a configuration element from the baseline trajectory for deriving the predicted trajectory;
  - sending the predicted trajectory to a guidance control unit for the vehicle; and
  - controlling a performance of the vehicle to follow the predicted trajectory.

10. The process of claim 9, further comprising:
- the predicted trajectory comprising a series of turn points; and
- generating the baseline lateral profile via using instantaneous changes in a course of the vehicle at each turn point in the series of turn points.

11. The process of claim 9, further comprising:
- respectively retrieving, at each turn point along the baseline trajectory, at least one of: the performance element or the configuration element of the vehicle; and
- using at least one of: the performance element or the configuration element, respectively, computing a turn radius at each turn point; and
- replacing, using the turn radius, the baseline lateral profile with an adjusted lateral profile.

12. The process of claim 11, further comprising:
- generating, using the adjusted lateral profile, an adapted vertical profile; and
- forming the predicted trajectory by merging the adjusted lateral profile with the adapted vertical profile.

13. The process of claim 9, wherein the vehicle is an aerospace vehicle.

14. The process of claim 9, wherein generating the vertical profile for the baseline trajectory comprises applying airspace constraints onto the baseline lateral profile.

15. The process of claim 9, further comprising:

subsequent to forming the baseline trajectory, adapting the vertical profile and therefrom deriving the predicted trajectory.

16. A process for reducing congestion in an Air Traffic Management system, the process comprising:

deriving a predicted trajectory for a vehicle, via:

a processor executing an algorithm specially programmed for:

generating a baseline lateral profile for a baseline trajectory;

subsequently generating a baseline vertical profile for the baseline trajectory;

subsequently forming the baseline trajectory by merging the baseline vertical profile with the baseline lateral profile; and using at least one of: a performance element or a configuration element from the baseline trajectory for deriving the predicted trajectory; and receiving and using, in the Air Traffic Management system, the predicted trajectory for the vehicle for deconflicting the predicted trajectory for the vehicle from other predicted trajectories of other vehicles.

17. The process of claim 16, further comprising:

the predicted trajectory comprising a series of turn points; and generating the baseline lateral profile via using instantaneous changes in a course of the vehicle at each turn point in the series of turn points.

18. The process of claim 16, further comprising:

respectively retrieving, at each turn point along the baseline trajectory, at least one of: the performance element or the configuration element of the vehicle;

using at least one of: the performance element or the configuration element, respectively, computing a turn radius at each turn point; and replacing, using the turn radius, the baseline lateral profile with an adjusted lateral profile.

19. The process of claim 18, further comprising:

generating, using the adjusted lateral profile, an adapted vertical profile; and forming the predicted trajectory by merging the adjusted lateral profile with the adapted vertical profile.

20. The process of claim 16, wherein generating the vertical profile for the baseline trajectory comprises applying airspace constraints onto the baseline lateral profile, and further comprising, subsequent to forming the baseline trajectory, adapting the baseline vertical profile and therefrom deriving the predicted trajectory.

* * * * *